United States Patent [19]

Rubbelke

[11] Patent Number: 4,845,885

[45] Date of Patent: Jul. 11, 1989

[54] SELF-ORIENTING WEIGHTED BOBBER

[76] Inventor: Irvin L. Rubbelke, 380 S. Lexington Pkwy., St. Paul, Minn. 55105

[21] Appl. No.: 300,595

[22] Filed: Jan. 23, 1989

[51] Int. Cl.[4] .............................................. A01K 93/00
[52] U.S. Cl. ...................................... 43/44.95; 43/17; 43/44.87
[58] Field of Search ...................... 43/17, 17.5, 43.14, 43/43.17, 44.87, 44.91, 44.93, 44.95, 44.92

[56] References Cited

U.S. PATENT DOCUMENTS

| | | | |
|---|---|---|---|
| 2,255,959 | 9/1941 | Barber | 43/17 |
| 3,323,247 | 6/1967 | Murray | 43/44.87 |
| 3,760,527 | 6/1973 | Hamren | 43/44.91 |
| 3,832,795 | 9/1974 | Wolfe | 43/17 |
| 3,913,256 | 10/1975 | Morris et al. | 43/44.95 |
| 4,300,304 | 11/1981 | Maycock et al. | 43/44.87 |

Primary Examiner—Nicholas P. Godici
Assistant Examiner—Michael Willism Starkweather
Attorney, Agent, or Firm—Peterson, Wicks, Nemer & Kamrath

[57] ABSTRACT

Two plastic shells are secured together to form a generally hollow buoyant member. A weight member in the form of a metal washer is contained within the buoyant member. A stem projects from one curved surface portion of the buoyant member, doing so along the longitudinal axis of the buoyant member. When the stem is pressed inwardly to overcome the bias of a coil spring, a hook is projected from an opposite curved surface portion of the buoyant member so that a segment of the fish line can be attached. When a fish actually takes the fishhook at the end of the line having the bobber attached thereto, the bobber is reoriented from a horizontal position into a vertical position with the stem thereof then extending upwardly. When the fish only exerts a slight pull on the line, a pull insufficient to swing the bobber into a vertical position, the bobber angularly aligns itself on the surface of the water in the direction the wind is blowing.

6 Claims, 2 Drawing Sheets

SELF-ORIENTING WEIGHTED BOBBER

BACKGROUND OF THE INVENTION

1. Field of the Invention

This invention relates generally to bobbers for attachment to fish lines, and pertains more particularly to a weighted bobber that shifts from a horizontal to a vertical position when a fish exerts a sufficient pull on the line.

2. Description of the Prior Art

Bobbers that tilt from a horizontal position to a vertical position when a fish takes the line are not new. For example, U.S. Pat. No. 1,870,520 was granted on Aug. 8, 1932 to Miles E. Loehr for "Fish Line Float." The float involves a ball-like cork member that can be manually slid along a slender body member into an appropriate position. No weight or extra mass is added to the cork member to counterbalance the weight of the line, sinker, hook and bait. Furthermore, the cork member is fragile and vulnerable to breakage, especially during storage with other items in a tackle box, if care is not exercised.

Considerably more elaborate tilting bobbers have been devised and examples of these appear in the following patents: U.S. Pat. No. 2,493,971 issued on Jan. 10, 1950 to Elmer G. Johnson for "Bobber for Fishing Lines," U.S. Pat. No. 2,547,308 granted on Apr. 3, 1951 to John H. Dean for "Illuminous Fishing Float," U.S. Pat. No. 3,323,247 granted on June 6, 1967 to Ernest E. Murray for "Fishing Bobber," and U.S. Pat. No. 3,832,795 issued on Sept. 3, 1974 to Henry S. Wolfe for "Fishing Float." All of these bobbers have common shortcomings in that they are relatively complex, not readily castable and relatively costly. Certain of them are not as sensitive or responsive to slight fish pulls as they should be. Hence, a definite need exists for a bobber that orients itself, changing from a horizontal position to a vertical position, when even slight pulls on the line are exerted by a fish prior to the fish actually seizing or taking the hook.

SUMMARY OF THE INVENTION

Accordingly, an object of my invention is to provide a bobber that is exceedingly simple as far as its construction is concerned. More specifically, it is within the purview of the invention to provide a bobber having an outer appearance and shape generally resembling conventional bobbers.

Another object is to employ virtually the same fabricating techniques for my bobber that have heretofore been used in manufacturing the general type of bobber currently being marketed. Consequently, it follows from the above that an aim of my invention is to provide an effective bobber that will be inexpensive to manufacture, thereby encouraging its widespread use by fishermen.

Another object of the invention is to provide a bobber that enables the fish line to be attached in the same fashion that the fisherman is accustomed to.

A still further object is to provide a bobber that has a generally smooth outer surface, actually corresponding to the surfaces of conventional bobbers. However, quadrantly spaced grooves are formed in the outer surface of one shell of which my bobber is comprised, the grooves resulting from internally disposed positioning ribs. The grooves provide a distinctive and aesthetically attractive appearance.

A further object of the invention is to provide a weighted bobber so that it can be readily and accurately cast without being deflected from a desired trajectory, as is the case with the prior art devices with which I am acquainted.

Yet another object is to provide a bobber that is long-lasting, one not vulnerable to breakage from normal handling and usage. In other words, my bobber is as rugged as conventional bobbers, even though it is adapted to tilt from a horizontal position to a vertical position when the line is taken by a fish.

Briefly, my invention envisages a generally hollow bobber having a stem projecting from one end thereof and a hook at the other end by way of which a fish line may be releasably attached. The bobber is comprised of two plastic shells. The shells accommodate therein a weight in the form of a steel washer which causes the bobber to assume a horizontal position when resting on the water's surface and which will allow the bobber to tilt quickly into a vertical position after the fish has seized the hook. When the fish is just playing with the bait, that is, only nibbling at the bait, my bobber angles itself, while still horizontal, in a direction determined by only a slight breeze that alerts the fisherman to the fact that a fish is about to bite the bait. The fisherman can either pay out or reel in the line dictated by the knowledge acquired by reason of the surface angulation of my bobber.

DESCRIPTION OF THE PREFERRED EMBODIMENT

Figure 1:
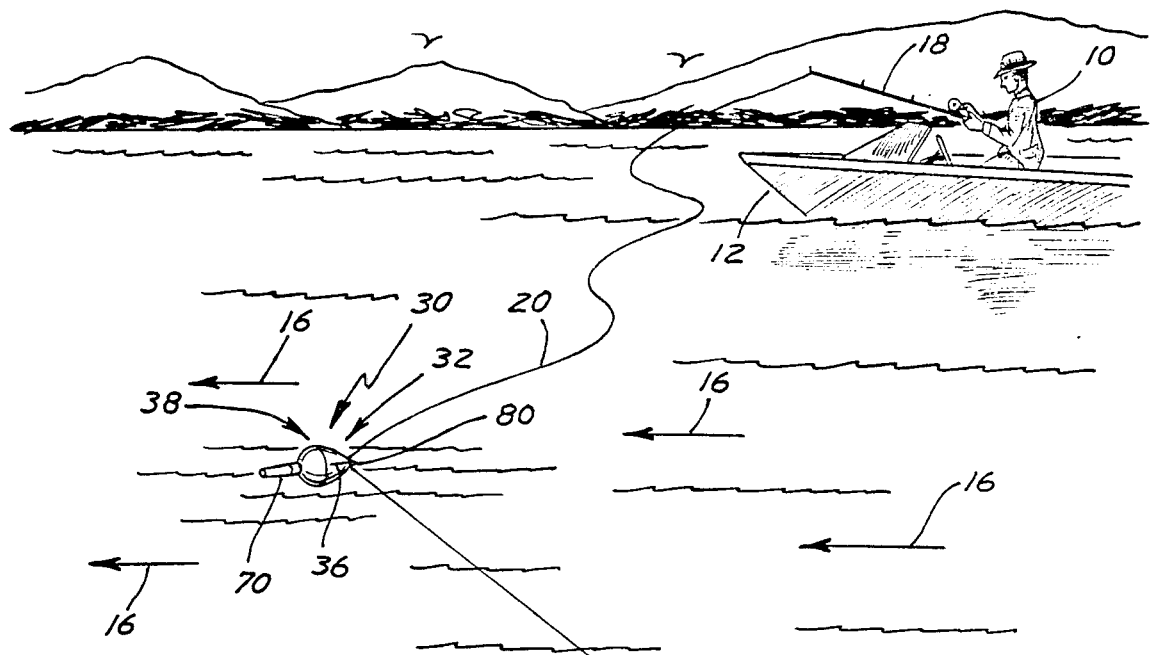
FIG. 1 is a perspective view of my bobber in actual use, a portion of a fish being shown playing with the bait but before the fish has actually seized the hook.
Figure 2:
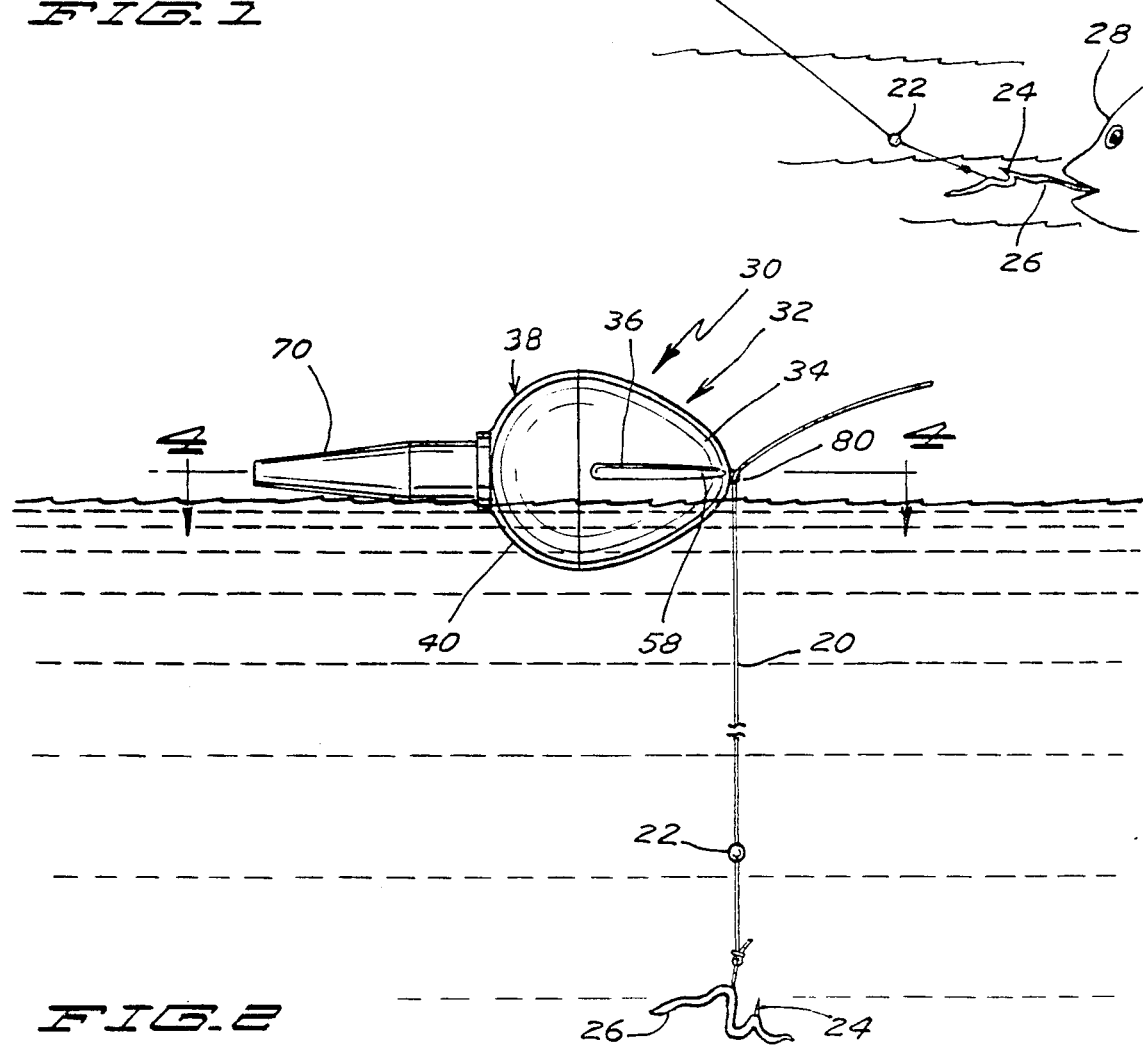
FIG. 2 is an elevational view on a larger scale taken in the direction of line 2—2 of FIG. 1.

In order to appreciate the benefits to be derived from a practicing of my invention, FIG. 1 is presented illustrating a fisherman 10 in a boat 12 on a lake 14. As will later be better understood, the wind or breeze is in a direction indicated by the several arrows 16.

The fisherman 10 is holding a fishing rod 18 having a fish line 20 associated therewith. A sinker 22 is attached to the line 20 near the lower end thereof where a fish-hook 24 has been fastened. Bait in the form of a worm 26 has been attached to the hook 24. Although not readily understandable at the moment, a fish 28 has been shown in FIG. 1 while only pulling on the worm 26; in FIG. 3, however, the fish 28 has actually seized the hook 24.

My bobber denoted generally by the reference numeral 30 has a bulbous configuration. The bobber 30 includes a plastic shell 32 having a curved surface portion 34 formed with quadrantly located grooves 36 which impart a distinctive and overall aesthetic appearance to the bobber 30. The structure forming the grooves 36 also perform an important function that will be described presently. The bobber 30 further includes a shell 38 mated therewith having a generally similar curved surface portion 40 but no grooves that would correspond to the grooves 36 in the surface 34 of the shell 32. From FIG. 4, it will be perceived that the shell 32 has an inwardly directed tubular portion 42, whereas the shell 38 has an inwardly directed tubular portion 44, the portion 44 being formed with a reduced diameter end 46 having a shoulder at 48. Within the tubular portion 44 is a recess 50.

The shell 32 has an annular lip or flange 52. Reference has already been made to the grooves 36. These grooves 36 are formed by inwardly directed ribs 54 having end walls 56 that function as positioning stops, as will soon be explained. The other ends of the ribs 54 merge smoothly in to the curved surface portion 34; these ends have been given the reference numeral 58.

The shell 38 is formed with an inset annular lip or flange 60 leaving a shoulder at 62. When the two shells 32 and 38 are interfitted or mated with each other, the lip or flange 60 is telescopically received within the annular lip or flange 52, the lip or flange 52 then abutting against the shoulder 62.

Figure 4:
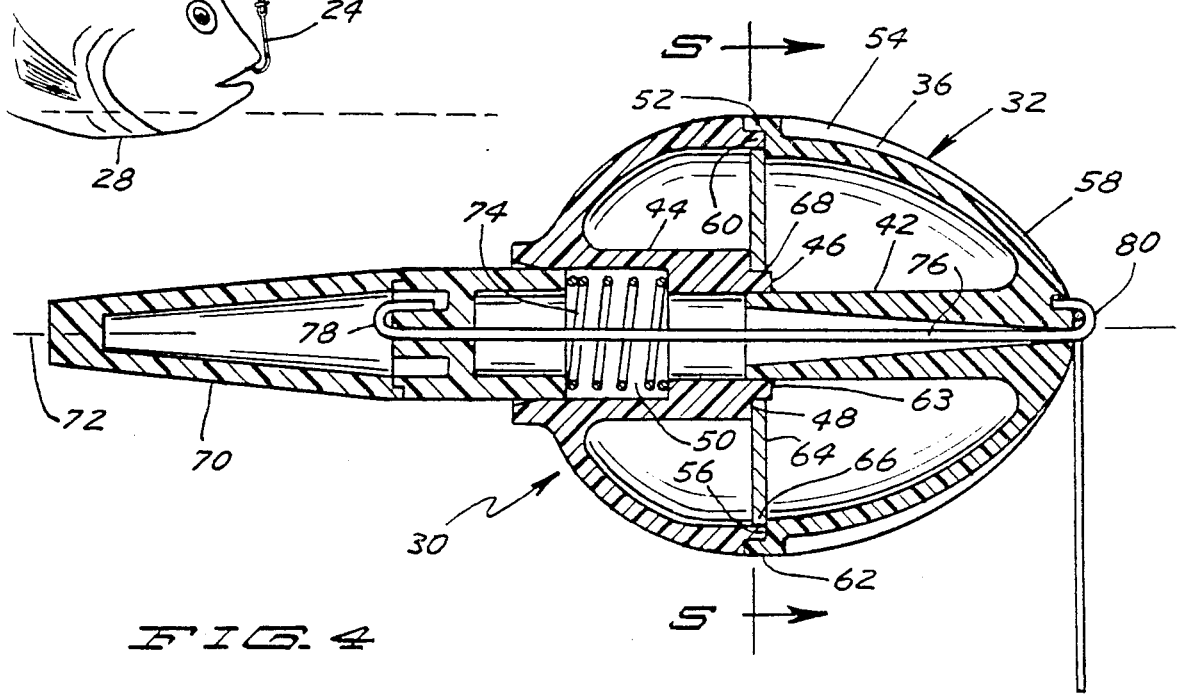
FIG. 4 is an enlarged sectional view taken in the direction of line 4—4 of FIG. 2.

Playing an important role in the practicing of my invention is a weight member in the form of a steel washer 64 having an outer peripheral portion 66 and a centrally located hole 68. The diameter of the hole 68 is slightly larger than that of the end 46 of the tubular portion and smaller than the diameter of the shoulder 48 so that the portion of the washer 64 circumjacent the hole 68 confronts the shoulder 48 as can be seen in FIG. 4. Also, as can be understood from FIG. 4, the outer peripheral portion 66 of the washer 64 confronts the end walls 56 of the four ribs 54. It will be appreciated that the washer 64 is held captive by the shoulder 48 at one side of the washer 64 and by the end walls of the ribs 54 at the other side. Only a loose retention of the washer 64 is needed. More specifically, when the annular lip 52 on the shell 32 bears against the shoulder 62 on the shell 38, the washer 64 need not be actually clamped between the shoulder 48 and the end walls 56. Hence, close molding tolerances are not required; as mentioned above, the washer 64 can be loosely retained. The weight of the washer need not be great, being only on the order of a fraction of an ounce. Ultrasonic welding, heat sealing or adhesive bonding may be used to retain the two shells 32 and 38 in their mated relationship. Actually, the lips 52 and 60 may constitute only a press fit. Preferably, though, some form of sealing is desired, just as with the way bobbers are currently being fabricated. For the sake of completeness, however, an adhesive bond is shown at 63 in FIG. 4 which secures the tubular portions 42 and 44 together.

Attention is now directed to an elongated stem 70 that projects from the curved surface 40, doing so along a longitudial axis 72 passing through the curved surface portions 34 and 40. Contained in the recess 50 is a coil spring 74 that biases the stem 70 outwardly or to the left as viewed in FIG. 4. By means of a stiff wire or rod 76 having curved or hooked ends 78 and 80 the stem 70 is held captive so that it can be reciprocally moved along the axis 72. More specifically, when the stem 70 is manually pressed to the right, as viewed in FIG. 4, the hook end 80 is projected outwardly so that a segment of the fish line 20 can be engaged therewith, as is typical with modern-day bobbers.

The weight of washer 64 relative to the weight of the remaining parts constituting the bobber 30 is susceptible to modification, depending largely on the size of the bobber 30. What is to be recognized is that the weight provided by the washer 64 is completely within the bobber 30. In other words, the weight of the washer 64 is distributed circumferentially around the interior, resisting tilting until a sufficient pull is exerted on the line 20. Thus, the bobber 30 remains horizontal until a sufficient pull is exerted, then assuming a vertical position which signals the fisherman 10 that he has caught the fish 28.

Figure 3:
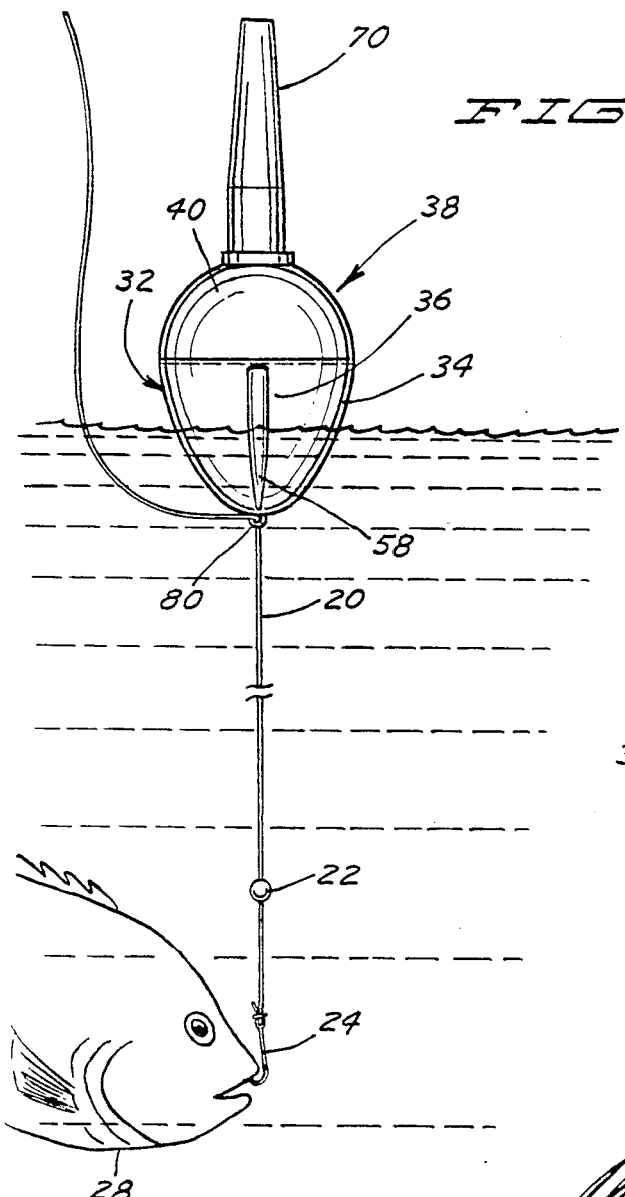
FIG. 3 is a view similar to FIG. 2 but after the fish has seized the hook to cause my bobber to tilt from the horizontal position of FIG. 2 into the vertical position shown in this figure.
Figure 5:
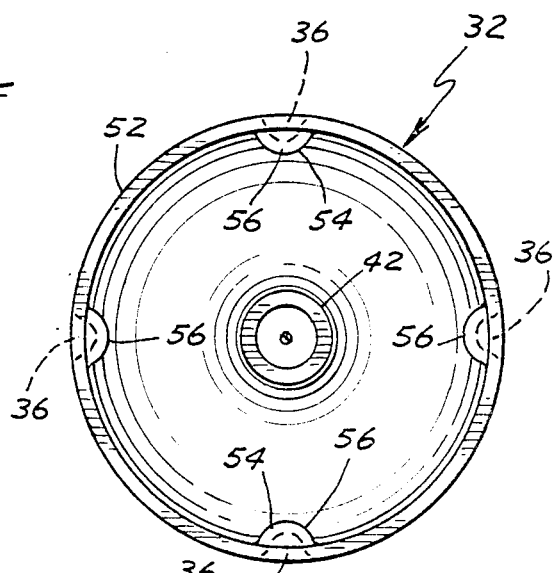
FIG. 5 is an end view of one of the shells, the view being taken in the general direction of line 5—5 of FIG. 4.

From the foregoing, it should be readily apparent that when the fish 28 takes the hook 24, as portrayed in FIG. 3, the bobber 30 is tilted about a transverse axis determined by the washer 64. The washer 64, owing to the concentration of mass approximately midway of the bobber 30, normally orients the bobber 30 in a horizontal position on the lake 14. However, when the stem 70 is swung through 90° by reason of a sufficient moment arm being applied as measured from the hook end 80 along the axis 72 to the center of the washer 64 and then radially outward to ite peripheral portion 66, the fisherman 10 readily sees the swinging of the stem 70 into vertical position and immediately knows that the fish 28 has taken the hook 24. The movement of the stem 70 through a 90° angle is far more noticeable to the fisherman 10 than when a vertically oriented conventional bobber is merely pulled downwardly by a fish. In other words, the swinging of the stem 70 from a horizontal position to a vertical position attracts far more attention.

One nicety of my invention, and this is illustrated in FIG. 1, is that when the fish 28 is only playing with the bait 26, there is but only a slight pull applied to the line 20, a tug so small that the bobber 30 is not swung through the 90° angle that it is when the fish 28 actually bites the hook 24 and is exerting a significant pull. However, when there is even a slight breeze, such as denoted by the arrows 16, and the fish 28 is only playing with the worm 26, or whatever bait is being used, this is enough resistance so that the stem 70 points in the direction of the breeze, thereby signifying to the fisherman 10 that a fish is indeed toying with the bait 26. This enables the fisherman 10 to plan his strategy far more effectively than otherwise. For instance, the fisherman might very well reel in some of the line 20 to entice the fish 28 to actually take the hook 24 rather than to have it depart should the fish 28 conclude that the bait 26 is not lively enough to warrant eating.

Consequently, the benefits to be derived from my invention are quite pronounced. Stated rather succinctly, there is a significant indication by reason of the tilting of the bobber 30 so as to swing the stem 70 from its horizontal position to a vertical one when the fish 28 has actually taken the hook 24, whereas only a slight pull on the bait 26 will apprise the fisherman 10 that a fish is in the vicinity and he can then decide what course of action is best suited for actually catching the fish 28.

I claim:
1. A bobber for a fish line comprising a generally hollow bulbulous buoyant member including two shells having oppositely located curved surface portions, an elongated stem projecting in a direction away from one of said curved surface portions along an axis extending through both of said curved surface portions, means associated with the other curved surface portion for engaging a segment of the fish line, and weight means located approximately midway between the ends of said bobber and having a central hole, one of said shells having a tubular portion extending into said hole.

2. A bobber in accordance with claim 1 in which said weight means constitutes a washer.

3. A bobber in accordance with claim 2 in which said washer is of metal and said buoyant member is of plastic.

4. A bobber in accordance with claim 3 in which said tubular portion has a reduced diameter end forming an annular shoulder, said reduced diameter end extending into said hole and a portion of said washer circumjacent said hole confronting said shoulder.

5. A bobber in accordance with claim 4 in which the other of said shells includes at least one inwardly directed rib confronting a peripheral portion of said washer on the opposite side of said washer from said circumjacent portion.

6. A bobber for a fish line comprising a bulbulous buoyant member including two shells having a longitudinal axis passing therethrough, and a metal washer contained in said buoyant member arranged perpendicular to said axis, one shell having a portion thereof confronting one side of said washer and the other shell having a portion thereof confronting one side of said washer and the other shell having a portion thereof confronting the other side of said washer, said one shell having an inwardly extending tubular portion having a reduced diameter end forming a shoulder, said shoulder constituting the portion confronting said one side of said washer in a region circumjacent said hole, and said other shell having an inwardly directed rib constituting the portion confronting the other side of said washer in a peripheral region thereof.

* * * * *